United States Patent
Jones

(10) Patent No.: US 9,360,143 B2
(45) Date of Patent: Jun. 7, 2016

(54) QUICK-CONNECT ASSEMBLY FOR A FLUID VALVE

(71) Applicant: Lincoln Brass Works, Inc., Waynesboro, TN (US)

(72) Inventor: James Dean Jones, Linden, TN (US)

(73) Assignee: Mueller Industries, Inc., Memphis, TN (US)

( * ) Notice: Subject to any disclaimer, the term of this patent is extended or adjusted under 35 U.S.C. 154(b) by 80 days.

(21) Appl. No.: 13/965,563

(22) Filed: Aug. 13, 2013

(65) Prior Publication Data

US 2014/0049042 A1   Feb. 20, 2014

Related U.S. Application Data

(60) Provisional application No. 61/682,970, filed on Aug. 14, 2012.

(51) Int. Cl.
*F16K 27/06* (2006.01)
*F16L 37/14* (2006.01)

(52) U.S. Cl.
CPC .............. *F16L 37/144* (2013.01); *F16K 27/06* (2013.01)

(58) Field of Classification Search
CPC ....... F16L 37/144; F16L 37/142; F16L 37/14; F16L 37/12; F16L 37/08; F16K 27/06
USPC .......................................... 251/148, 151, 152
See application file for complete search history.

(56) References Cited

U.S. PATENT DOCUMENTS

| | | | |
|---|---|---|---|
| 2,896,971 A | | 7/1959 | Kolar |
| 4,244,608 A | * | 1/1981 | Stuemky ............... F16L 37/144 24/545 |
| 4,601,497 A | * | 7/1986 | Bartholomew ..... F16L 37/0987 285/319 |
| 5,405,175 A | * | 4/1995 | Bonnah et al. ................ 285/305 |
| 5,586,792 A | * | 12/1996 | Kalahasthy et al. .......... 285/319 |
| 5,992,903 A | | 11/1999 | Bartholomew |
| 6,363,971 B1 | | 4/2002 | Kaylan et al. |
| 6,637,781 B1 | * | 10/2003 | Seymour, II ................... 285/305 |
| 6,834,891 B2 | * | 12/2004 | Matsubara et al. ........... 285/319 |
| 6,913,294 B2 | | 7/2005 | Treverton et al. |
| 7,059,288 B2 | | 6/2006 | Merrick et al. |
| 7,080,665 B2 | | 7/2006 | Whall |
| 7,089,939 B2 | | 8/2006 | Walker et al. |
| 7,096,887 B2 | | 8/2006 | Tupa et al. |
| 7,566,077 B2 | * | 7/2009 | Tsurumi ........................ 285/93 |
| 7,775,562 B2 | | 8/2010 | Sawada |
| 7,909,369 B2 | | 3/2011 | Kertesz et al. |

(Continued)

FOREIGN PATENT DOCUMENTS

DE           19503727           8/1996

*Primary Examiner* — John K Fristoe, Jr.
*Assistant Examiner* — Andrew J Rost
(74) *Attorney, Agent, or Firm* — Harness, Dickey & Pierce, P.L.C.

(57) ABSTRACT

A quick-connect assembly for connecting a fluid supply line, to a fluid valve, the assembly including a fluid supply line, a spacing element, a valve housing with an inlet and a transverse slot, and a spring clip. The valve housing has a face which includes an insertion end that defines a cavity having a valve housing stop. The spacing element and fluid supply line are adapted to be inserted into the cavity of the valve housing. The spring clip is configured to engage the valve housing and the fluid supply line after the spring clip is inserted into the transverse slot of the valve housing such that the fluid supply line is secured to the valve housing.

21 Claims, 7 Drawing Sheets

(56) References Cited

U.S. PATENT DOCUMENTS

| | | |
|---|---|---|
| 2010/0015560 A1 | 1/2010 | Kasprzyk et al. |
| 2010/0326547 A1 | 12/2010 | Haeberer et al. |
| 2011/0045423 A1 | 2/2011 | Young et al. |
| 2011/0057436 A1 | 3/2011 | Schrum et al. |
| 2011/0272935 A1 | 11/2011 | Confalonieri |
| 2012/0211977 A1* | 8/2012 | Callahan et al. ............ 285/313 |
| 2012/0284980 A1* | 11/2012 | Turnau et al. ................ 29/237 |

* cited by examiner

QUICK-CONNECT ASSEMBLY FOR A FLUID VALVE

CROSS-REFERENCE TO RELATED APPLICATIONS

This application claims the benefit of U.S. Provisional Application No. 61/682,970, filed on Aug. 14, 2012. The entire disclosure of the above application is incorporated herein by reference.

FIELD

The present disclosure relates to a fluid valve assembly and, more particularly, to a quick-connect assembly for a fluid valve and a method of use for such quick-connect assembly.

BACKGROUND

This section provides background information related to the present disclosure which is not necessarily prior art.

There has long been a need for joining a fluid-communicating assembly that has a valve member in a manner that fixedly and sealingly couples the components to one another. One common application accomplishes such a coupling via a threaded nut-and-bolt connector assembly.

Such threaded nut-and-bolt connector assemblies have several drawbacks. First, the nut-and-bolt assembly is prone to leaking. For instance, the nut and bolt may cross threads, wherein a space may result in the connection allowing for liquid or gas to escape the nut-and-bolt assembly. Nut-and-bolt assemblies may also loosen due to their innate torque sensitivities. For instance, nut-and-bolt assemblies may be loosened by periodic or continuous vibration of the apparatuses being connected. In certain aspects, threaded nut-and-bolt assemblies may require at least three machining operations, which increases the cost of such connector assemblies.

The present disclosure provides a valve including a transverse slot to accommodate a generally U-shaped spring clip, wherein the slot is formed on a face of the valve housing that extends beyond a valve outlet. A supply tube for gas flow is also provided, in which the supply tube includes a raised or beaded portion near an end of the tube. A spacing element is disposed between the raised or beaded portion and the end of the tube. The valve housing includes an inlet passage, through which the supply tube is inserted. The provided spring clip has tangs. The spring clip is accommodated in the transverse slot and the tangs are engaged to secure the spring clip in the transverse slot.

It is contemplated that a connector made according to the teachings of the present disclosure will cost less to make than common nut-and-bolt assemblies. In certain embodiments, for example, it is contemplated that one of the machined parts, i.e., a nut, will be eliminated and replaced with a cheaper stamped part, i.e., a spring clip. In addition, the threaded inlet portion of the valve housing is replaced with an inlet configuration and slot feature that requires fewer manufacturing operations. Thus, the cost to make a quick-connect assembly according to the present disclosure may be approximately half that of a typical nut-and-bolt assembly. Moreover, as no nut-and-bolt assembly is contemplated according to the present disclosure, leak potentials, such as due to cross threading and torque sensitivities, are not present with a quick-connect assembly made according to the present disclosure.

According to another embodiment formed in accordance with the present disclosure, there is provided a method of securing a valve housing to a tube for transmittal of gas, fluid, or the like, said method including:

(i) providing on the valve housing an inlet port with an inlet passage for inserting a fluid line and a transverse slot for inserting a spring clip, wherein the inlet port and transverse slot are on the same face of said valve housing;

(ii) providing a fluid supply line with a raised or beaded portion near an end of the fluid supply line and placing a spacing element around the near-the-end portion of said fluid supply line so said spacing element abuts the raised or beaded portion;

(iii) providing a substantially U-shaped spring clip with tangs;

(iv) inserting the end of the fluid supply line with the spacing element into the valve housing inlet passage such that the spacing element exerts a force on the fluid supply line and valve housing, thereby sealingly engaging the fluid supply line to the valve housing; and (v) inserting the spring clip into either end of the transverse slot such that the tangs, and therefore the spring clip, are held in place by a retainer in the transverse slot, wherein the spring clip exerts a constant pressure on said raised or beaded portion, thereby creating a constant level of pressure on said spacing element wherein the spacing element sealingly engages the fluid supply line to the valve assembly.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

SUMMARY

This section provides a general summary of the disclosure, and is not a comprehensive disclosure of its full scope or all of its features.

In some embodiments of the present disclosure, a gas valve assembly includes a valve housing having on one face of the valve housing an inlet port and at least one transverse slot. A fluid supply line has a valve insertion end inserted into the inlet port. The fluid supply line has a raised portion near the valve insertion end and has a spacing element between the raised portion and the valve insertion end. A spring clip inserted into the transverse slot sealingly retains the fluid supply line into the inlet port.

In another embodiment a gas valve assembly includes a valve housing having on one face of the valve housing an inlet port and at least one transverse slot. A fluid supply line has a valve insertion end inserted into the inlet port. The fluid supply line has a raised or beaded portion near the valve insertion end, has a first spacing element between the raised portion and the valve insertion end, and has a second spacing element between the raised portion and the transverse slot. A spring clip inserted into the transverse slot sealingly retains the fluid supply line into the inlet port.

A method for securing a fluid supply line to an inlet port formed in a face of a valve housing includes inserting a fluid supply line with a raised portion near an end portion of the fluid supply line and a spacing element around the fluid supply line between the raised portion and the end portion into the inlet port. The valve housing has a transverse slot on the same face of the valve housing as the inlet port. A U-shaped spring clip is inserted into the transverse slot. The spring clip securely holds the fluid supply line in sealing engagement with the inlet port.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
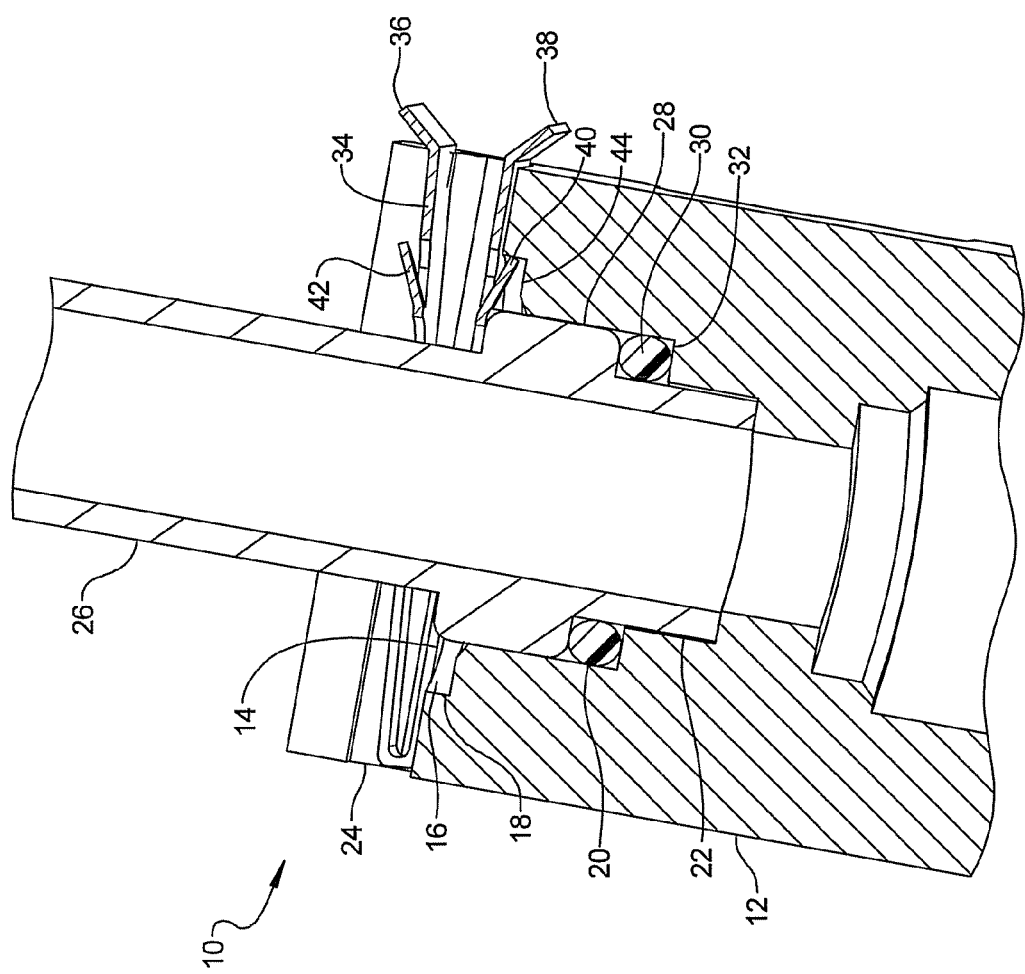
FIG. 1 is a cross-sectional view of a valve assembly of the present disclosure.

Example embodiments will now be described more fully with reference to the accompanying drawings.

The following description of the preferred embodiment is merely exemplary in nature and is in no way intended to limit the disclosure, its applications, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the attached figures, a valve assembly 10 according to the principles of the present disclosure will now be described. With reference to FIG. 1, the valve assembly 10 includes a valve housing 12. The valve housing 12 can be made from any structural material, such as plastic, ceramic, copper, brass, bronze, stainless steel, another metal or metal alloy. In the example provided, the valve housing 12 is made of an aluminum alloy. The valve housing 12 has an inlet port 14 allowing entry into inlet passage 16, wherein the inlet passage 16 contains sequential decrements of diameter 18, 20 and 22 (best shown in FIGS. 1 and 4). More specifically, the inlet passage 16 extends radially inward into the valve housing 12. The inlet passage 16 can be formed by a drilling operation. The valve housing 12 includes a transverse slot 24 on the side of the valve housing that has the inlet port 14. The transverse slot 24 has openings on opposing sides.

Figure 2:
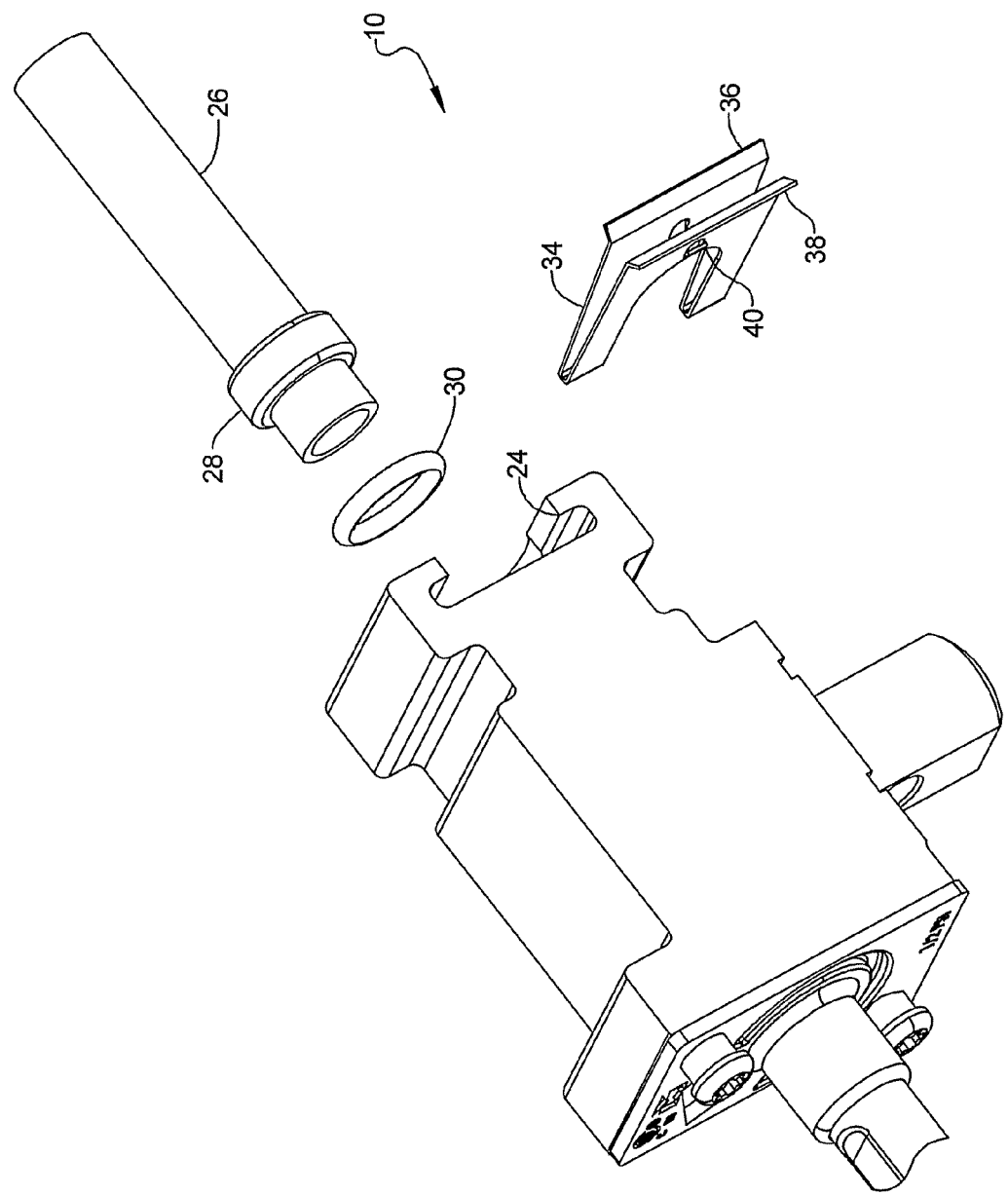
FIG. 2 is an exploded, perspective view of the valve assembly of FIG. 1.

With reference to FIG. 2, a fluid supply line 26 includes a beaded or other raised portion 28 that has an increased outer diameter in relation to the remainder of fluid supply line 26. The fluid supply line 26 can be flexible and can be made from any structural material, such as plastic, copper, brass, bronze, stainless steel, another metal or metal alloy. In the example provided, the fluid supply line 26 is made of an aluminum alloy. In certain embodiments, the fluid supply line 26 is covered with an epoxy to enhance durability. The fluid supply line 26 communicates (e.g., transfers, routes, transmits) fluids. The communicated fluids can be water, propane, butane, or natural gas. The fluid supply line 26 can be received in inlet passage 16.

Referring to FIG. 1, a spacing element 30 is inserted into the inlet passage 16 along with the fluid supply line 26 such that the spacing element 30 is between a valve housing stop 32 and the bead portion 28, and the spacing element 30 contacts the valve housing stop 32. The spacing element 30 is sized such that it may pass diameters 18 and 20 but is too large to pass diameter 22 that is defined by the valve housing stop 32.

The spacing element 30 can be a gasket. The spacing element 30 can be an "endless" member, such as an O-ring. The O-ring may be composed of thermoplastics or synthetic rubbers, such as butadiene rubber, butyl rubber, chlorosulfonated polyethylene, epichlorohydrin rubber, ethylene propylene diene monomer, ethylene propylene rubber, fluoroelastomer, polyacrylate rubber, polychloroprene, polyisoprene, polysulfide rubber, sanifluor, silicone rubber, or styrene butadiene rubber. Preferably, the gasket 30 is an O-ring composed of ethylene propylene diene monomer. In the particular example provided, the spacing element 30 is a resilient O-ring which sealingly engages the fluid supply line 26 and the valve housing 12 such that fluids do not leak out of the point where the fluid supply line 26 and valve housing 12 are connected.

Figure 3:
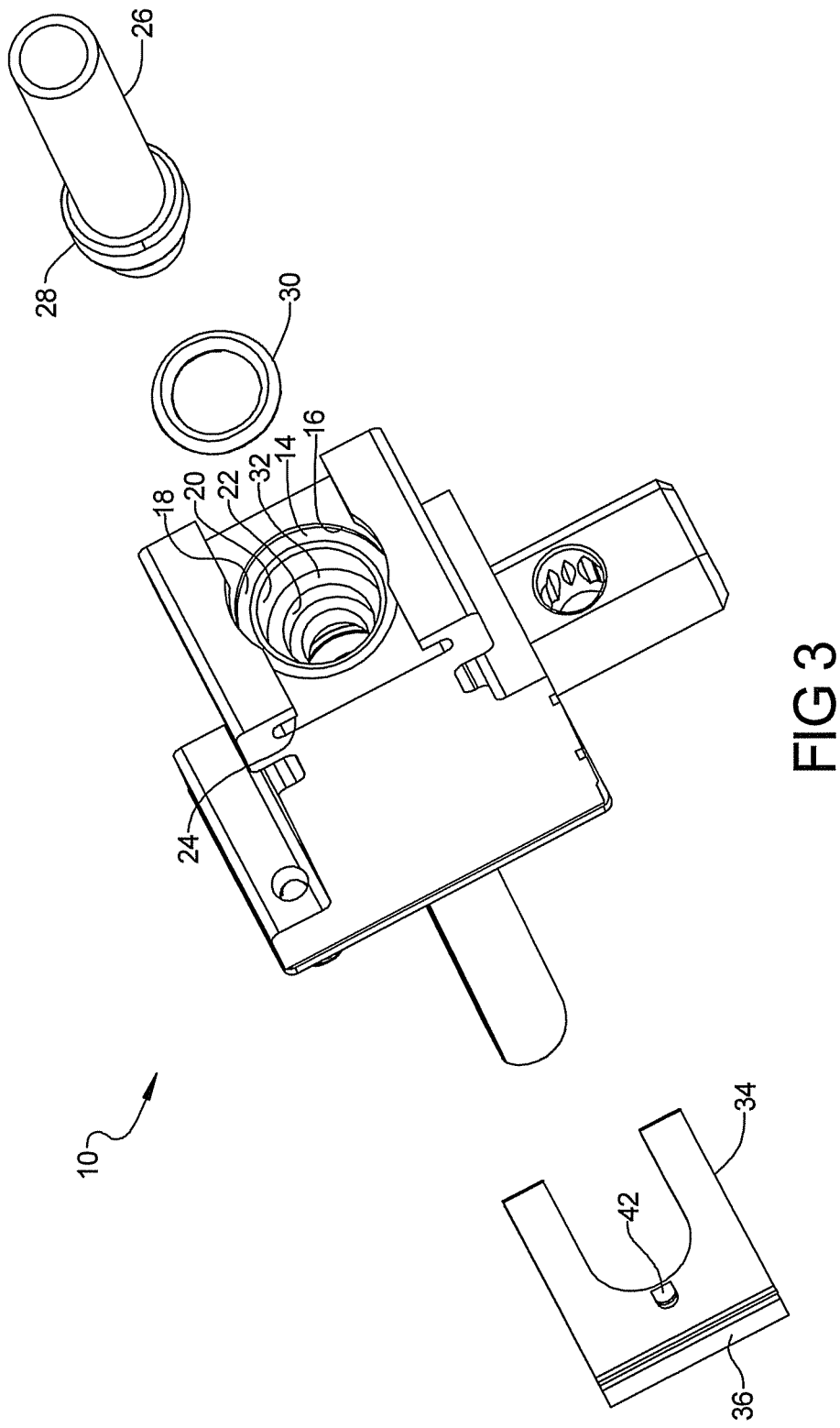
FIG. 3 is another exploded, perspective view of the valve assembly of FIG. 1.

Referring to FIGS. 2 and 3, a U-shaped spring clip 34 has clip wings 36 and 38 and retaining tangs 40 and 42. As shown in FIG. 1, the spring clip 34 is inserted into the transverse slot 24. As the transverse slot 24 has opposing openings and the spring clip 34 is universal, the spring clip 34 may be inserted into either opposing opening of transverse slot 24. Excluding the length of the spring clip wings 36 and 38, the spring clip 34 may be substantially similar in size to the length of the transverse slot 24, or smaller. The spring clip 34 can be fabricated from stainless steel, copper, other metals and alloys thereof, plastic, or any other material that has spring qualities and is generally useful in securing an article. In a preferred embodiment, spring clip 34 is inserted into transverse slot 24 after the supply line 26 and the spacing element 30 have been inserted into the inlet passage 16. The clip wings 36 and 38 can be actuated by manually compressing them or by merely applying pressure to insert the clip into transverse slot 24 which will in turn compress clip wings 36 and 38 together. When the spring clip 34 is fully inserted into transverse slot 24, spring clip 34 will securely be engaged with the fluid supply line 26.

The raised or beaded portion 28 can obstruct the spring clip 34 from being inserted into the transverse slot 24 unless a certain minimum amount of pressure is exerted on the spacing element 30 to compress it against the housing stop 32. As such, without exerting the requisite pressure on the fluid line assembly 26, the spring clip 34 may not be inserted into the transverse slot 24. Moreover, the requisite pressure to be applied to the fluid supply line 26 so that the raised or beaded portion 28 will not obstruct insertion of the spring clip 34 into the transverse slot 24 is an amount that will sealingly engage the spacing element 30 and, therefore, the fluid supply line 26, to the valve housing 12.

Figure 4:
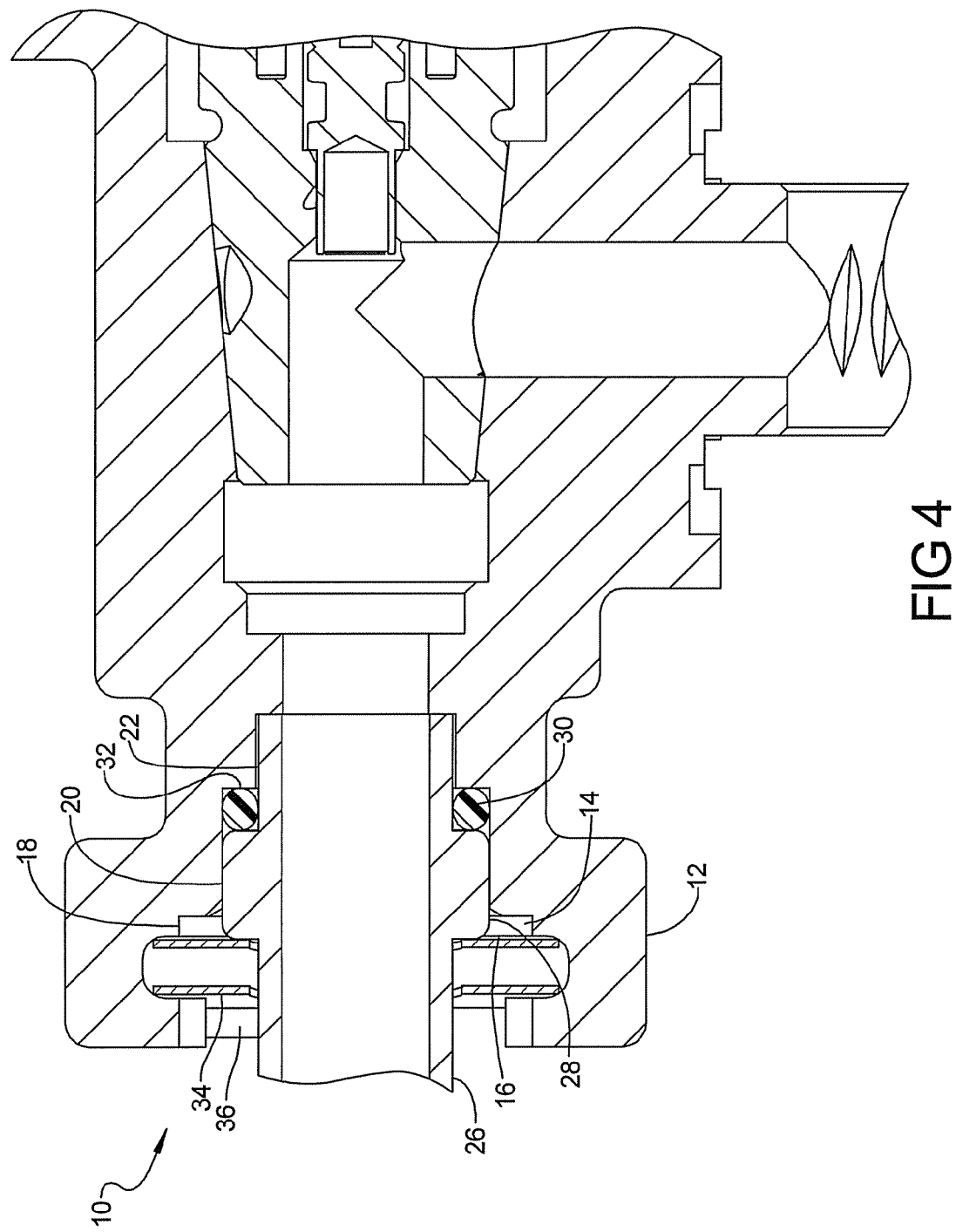
FIG. 4 is another cross-sectional view of the valve assembly of FIG. 1.

The spring clip 34 may be inserted into the transverse slot 24 such that the retaining tang 40 engages a tang retainer 44. As shown in FIG. 4, the retaining tang 40 that is configured to engage tang retainer 44 can be retaining tang 40, or retaining tang 42, depending on the orientation of the spring clip 34.

In certain embodiments, the spring clip 34, the fluid line assembly 26, and the valve assembly 10 are configured in proportion to one another such that the retaining tang 40 does not engage tang retainer 44 unless the spacing element 30 is compressed between the raised or beaded portion 28 of the fluid supply line 26 and the valve housing stop 32 of the valve housing 12.

In certain embodiments, compression of the clip wings 36 and 38 toward each other allows the spring clip 34 to be fully inserted into transverse slot 24, thereby allowing the retaining tang 40 (or the retaining tang 42) to engage the tang retainer 44. Engagement of the retaining tang 40 (or the retaining tang 42) with the tang retainer 44 prevents removal of the spring clip 34, and thereby securely engages the spring clip 34 with the valve housing 12.

To remove spring clip 34 from the transverse slot 24, the clip wings 36 and 38 can be compressed until the retaining tang 40 (or the retaining tang 42) clears the tang retainer 44 and the spring clip 34 can then be pulled out of transverse slot 24.

In light of the above discussion of the structure of the valve assembly 10, the method of using the spring clip 34 as a quick-connect assembly to join fluid line 26 and valve housing 12 will now be described. First, the spacing element 30 is placed around the fluid line assembly 26 such that it is fitted adjacent to the raised or beaded portion 28. Next, the fluid line assembly is inserted into the valve inlet port 14 of the valve housing 12 until the spacing element 30 comes into pressurized contact with the valve stop 32. In such position, the transverse slot 24 will be clear of the raised or beaded portion 28.

Next, the spring clip 34 is inserted into either open end of the transverse slot 24 until the spring clip wings 36 and 38 contact the surface of the valve housing 12. In this configuration, the retaining tang 40 (or retaining tang 42) engages the tang retainer 44, thereby preventing the spring clip 34 from being removed out of the transverse slot 24. When the spring clip 34 is fully inserted into transverse slot 24, the spring clip 34 is compressed, whereby the spring force of the spring clip 34 is exerted on the raised or beaded portion 28 to retain the fluid line assembly 26 in sealing contact with the valve housing 12.

Figure 5:
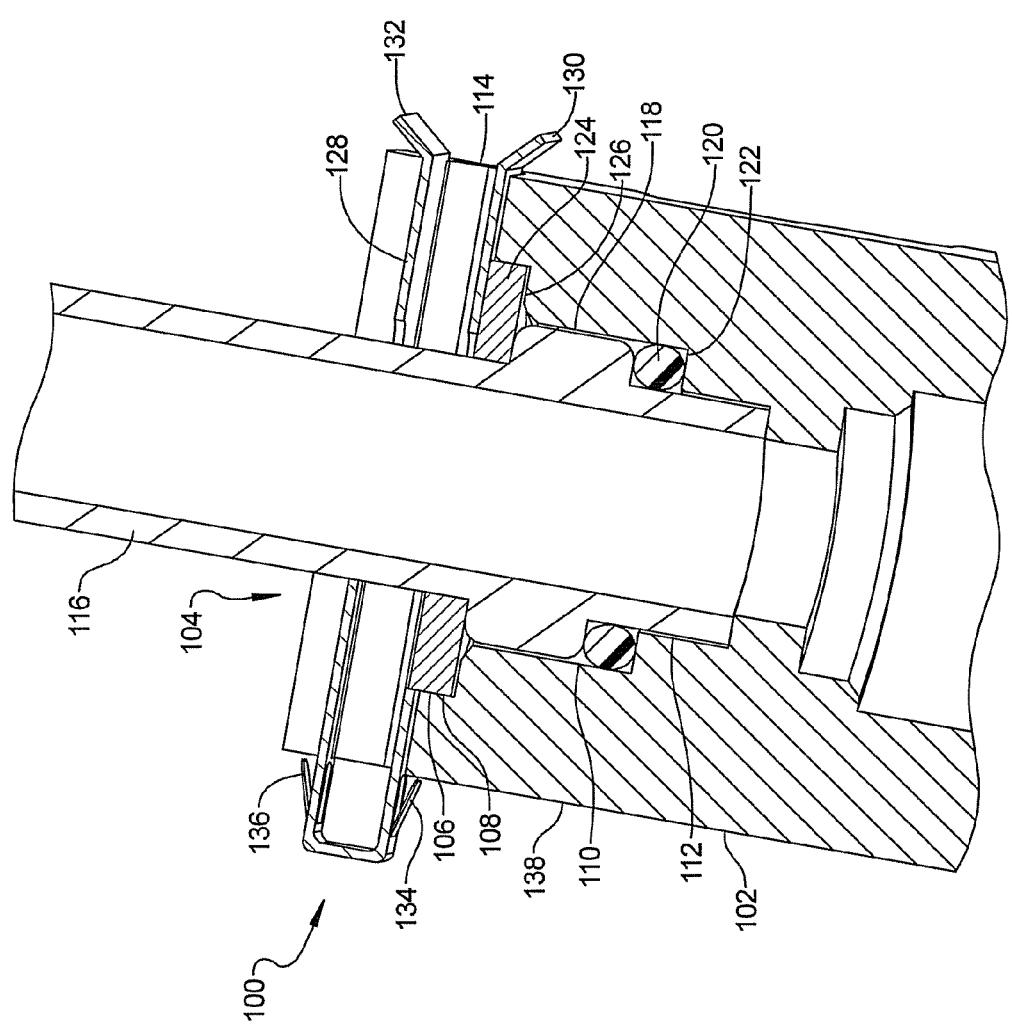
FIG. 5 is a cross-sectional view of another embodiment of a valve assembly of the present disclosure.
Figure 6:
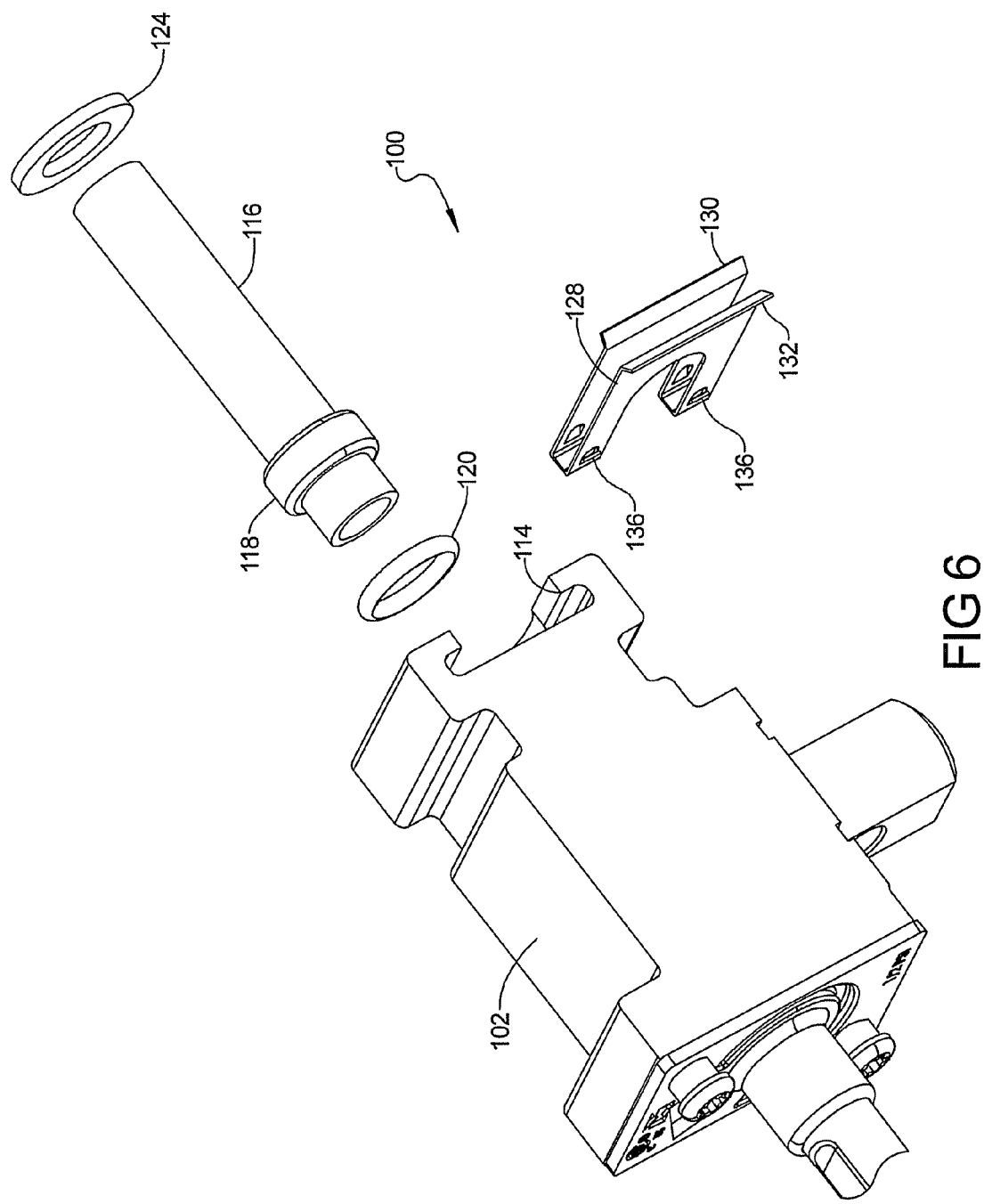
FIG. 6 is an exploded, perspective view of the valve assembly of FIG. 5.
Figure 7:
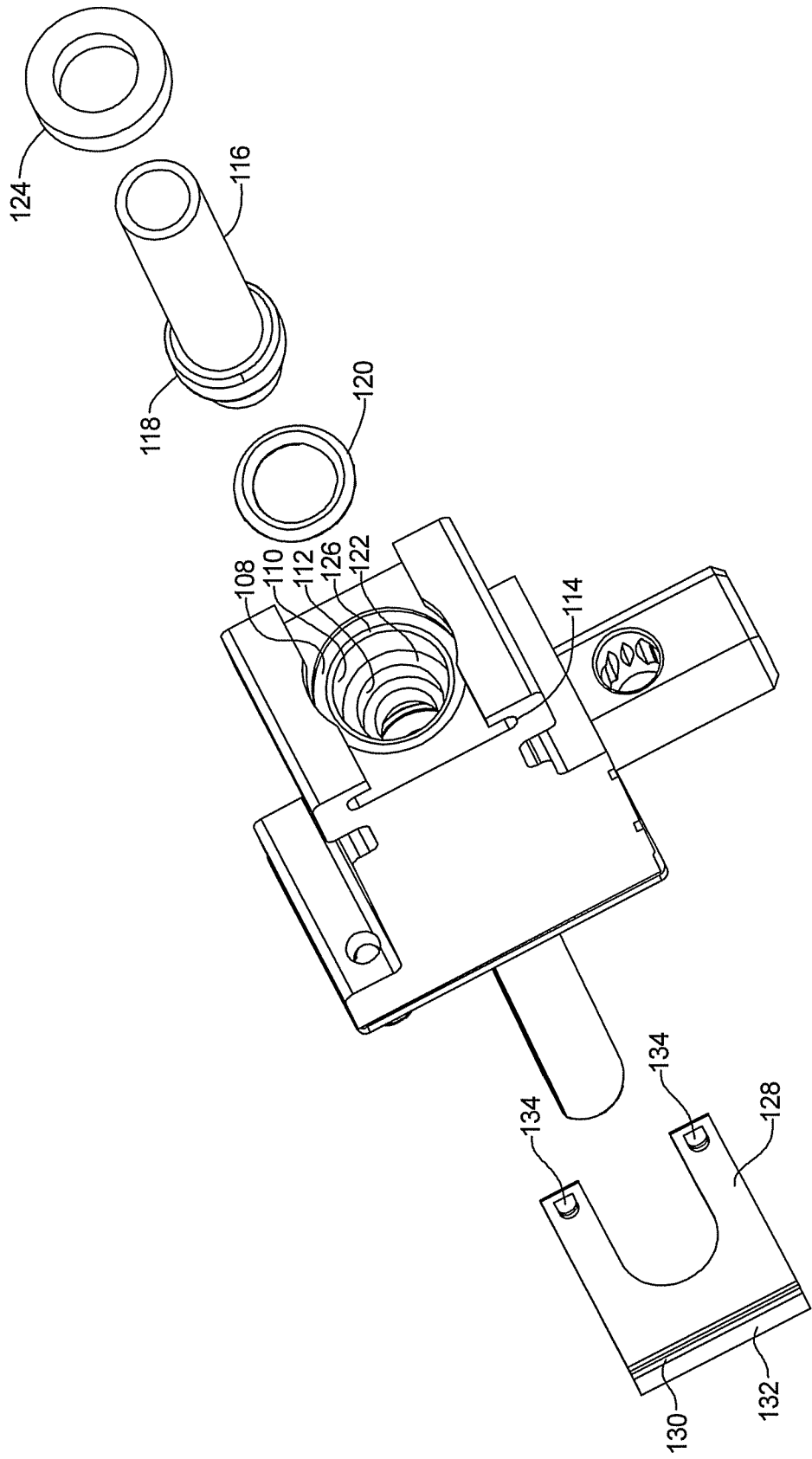
FIG. 7 is another exploded, perspective view of the valve assembly of FIG. 5.

Now referring to FIGS. 5-7, another embodiment of a valve assembly 100 according to the principles of the present disclosure is illustrated. The valve assembly 100 may include the same features of valve assembly 10. The valve assembly 100 includes a valve housing 102. The valve housing 102 can be made from any structural material, such as plastic, ceramic, copper, brass, bronze, stainless steel, another metal or metal alloy. In the example provided, the valve housing 102 is made of an aluminum alloy. The valve housing 102 has an inlet port 104 allowing entry into inlet passage 106, wherein the inlet passage 106 contains sequential decrements of diameter 108, 110 and 112 (best shown in FIG. 5). More specifically, the inlet passage 106 extends radially inward into the valve housing 102. The inlet passage 106 can be formed by a drilling operation. The valve housing 102 includes a transverse slot 114 on the side of the valve housing that has the inlet port 104. The transverse slot 114 has openings on opposing sides.

A fluid supply line 116 includes a beaded or other raised portion 118 that has an increased outer diameter in relation to the remainder of fluid supply line 116. The fluid supply line 116 can be flexible and can be made from any structural material, such as plastic, copper, brass, bronze, stainless steel, another metal or metal alloy. In the example provided, the fluid supply line 116 is made of an aluminum alloy. In certain embodiments, the fluid supply line 116 is covered with an epoxy to enhance durability. The fluid supply line 116 communicates (e.g., transfers, routes, transmits) fluids. The communicated fluids can be water, propane, butane, or natural gas. The fluid supply line 116 can be received in inlet passage 106.

A first spacing element 120 is inserted into the inlet passage 106 along with the fluid supply line 116 such that the first spacing element 120 is between a valve housing stop 122 and the bead portion 118, and the first spacing element 120 contacts the valve housing stop 122. The first spacing element 120 is sized such it may pass diameters 108 and 110 but is too large to pass diameter 112 that is defined by the valve housing stop 122.

The first spacing element 120 can be a gasket. The first spacing element 120 can be an "endless" member, such as an O-ring. The O-ring may be composed of thermoplastics or synthetic rubbers, such as butadiene rubber, butyl rubber, chlorosulfonated polyethylene, epichlorohydrin rubber, ethylene propylene diene monomer, ethylene propylene rubber, fluoroelastomer, polyacrylate rubber, polychloroprene, polyisoprene, polysulfide rubber, sanifluor, silicone rubber, or styrene butadiene rubber. Preferably, the gasket 120 is an O-ring composed of ethylene propylene diene monomer. In the particular example provided, the first spacing element 120 is a resilient O-ring which sealingly engages the fluid supply line 116 and the valve housing 102 such that fluids do not leak out of the point where the fluid supply line 116 and valve housing 102 are connected.

A second spacing element 124 is inserted into the inlet passage 106 along with the fluid supply line 116 such that the second spacing element 124 is between the bead portion 118 and the transverse slot 114. The second spacing element 124 is configured to apply a compressive force on the bead portion 118, and effectively the first spacing element 120, to secure the fluid supply line 116 in the valve housing 102. The second spacing element 124, the valve housing 102, and the bead portion 118 are configured such that a gap exists between the second spacing element 124 and the valve housing 102 when the supply line 116 is installed in the valve housing 102 to endure adequate compression of the supply line 116 in the valve housing 102. The gap may be within a predetermined threshold range. The second spacing element 124 may be configured to contact a step 126 in the inlet passage 106 if an amount of compression on the first spacing element 120 exceeds a predetermined threshold. The second spacing element 124 is sized such it may pass diameter 108 but is too large to pass diameter 110 that is defined by the step 126.

The second spacing element 124 can be an "endless" member, such as a washer. The washer may be composed of metal, plastic, fibers, or other common materials known in the art, such as aluminium, steel, stainless steel, aramids, bimetals, bronze, brass, ceramics, copper, felt, fibers, hastelloy, iron, leather, mica, Inconel, Monel, rubber, silicon bronze, zinc, and titanium. In the particular example provided, the second spacing element 124 is a washer which engages the fluid supply line 116 and a U-shaped spring clip 128 and applies compressive pressure from the U-shaped spring clip 128 on the fluid supply line 116 such that fluids do not leak out of the point where the fluid supply line 116 and valve housing 102 are connected.

The second spacing element 124 may also be a gasket or an endless member such as an O-ring. The O-ring may be composed of thermoplastics or synthetic rubbers, as previously described.

The U-shaped spring clip 128 has a at least one clip wing 130 and 132 and at least one retaining tab 134 and 136. As shown in FIG. 5, the spring clip 128 is inserted into the transverse slot 114. As the transverse slot 114 has opposing openings and the spring clip 128 is universal, the spring clip 128 may be inserted into either opposing opening of transverse slot 114. The spring clip 128 may be larger than the length of the transverse slot 114, protruding from each side of the transverse slot 114 when assembled. The spring clip 128 can be fabricated from stainless steel, copper, other metals and alloys thereof, plastic, or any other material that has spring qualities and is generally useful in securing an article. In a preferred embodiment, spring clip 128 is inserted into transverse slot 114 after the supply line 116, the first spacing element 120, and the second spacing element 124 have been inserted into the inlet passage 106. The clip wings 130 and 132 can be actuated by manually compressing them or by merely applying pressure to insert the clip into transverse slot 114 which will in turn compress clip wings 130 and 132 together. When the spring clip 128 is fully inserted into transverse slot 114, spring clip 128 will securely be engaged with the fluid supply line 116.

The second spacing element 124 can obstruct the spring clip 128 from being inserted into the transverse slot 114 unless a certain minimum amount of pressure is exerted on the first spacing element 120 to compress it against the housing stop 122. As such, without exerting the requisite pressure on the fluid line assembly 116, the spring clip 128 may not be inserted into the transverse slot 114. Moreover, the requisite pressure to be applied to the fluid supply line 116 so that the second spacing element 124 will not obstruct insertion of the spring clip 128 into the transverse slot 114 is an amount that will sealingly engage the first spacing element 120 and, therefore, the fluid supply line 116, to the valve housing 102.

The spring clip 128 may be inserted into the transverse slot 114 such that the retaining tabs 134 and 136 protrude past the opposite end of the transverse slot 114 and may or may not engage with an outer wall 138 of the valve housing 102. The retaining tabs 134 and 136 are configured to expand after passing through the transverse slot 114 and work with the clip wings 130 and 132 to retain the spring clip 128 within the transverse slot 114. The clip wings 130 may or may not engage with an outer wall opposite the outer wall 138 of the valve housing 102.

In certain embodiments, compression of the clip wings 130 and 132 toward each other allows the spring clip 128 to be fully inserted into transverse slot 114, thereby allowing the retaining tabs 134 and 136 to expand and engage the outer wall 138. Engagement of the retaining tabs 134 and 136 with the outer wall 138 prevents removal of the spring clip 128, and thereby securely engages the spring clip 128 with the valve housing 102. When the spring clip 128 is fully inserted in the transverse slot 114 and engaged with the valve housing 102 and the retaining tabs 134 and 136 are engaged with the outer wall 138 of the valve housing 102, the retaining tabs 134 and 136 prevent tampering of the valve assembly 100 without damaging the fluid supply line 116.

In certain embodiments, the spring clip 128 may only include one retaining tab 134 (or retaining tab 136) for securely engaging the spring clip 128 with the valve housing 102. In other embodiments, the spring clip 128 may include a pair of retaining tabs 134 (or 136) on each side (as shown in FIGS. 6 and 7) or may have only one retaining tab 134 and 136 on each side.

To remove spring clip 128 from the transverse slot 114, the retaining tabs 134 and 136 must be compressed until the retaining tabs 134 and 136 clear the outer wall 138 and the spring clip 128 can then be pulled out of transverse slot 114.

The retaining tabs 134 and 136 may provide for the spring clip 128 to be tamper-resistant. Because the retaining tabs 134 and 136 expand beyond the outer wall 138 of the valve housing 102, the retaining tabs 134 and 136 must be physically compressed to remove the spring clip 128 from the transverse slot 114, preventing unwanted disengagement of the fluid supply line 116 from the valve housing 102. The physical compression of the retaining tabs 134 and 136 may require a specialized tool, or the retaining tabs 134 and 136 may be compressed by hand. The retaining tabs 134 and 136 must be compressed independently from the clip wings 130 and 132 to remove the spring clip 128 from the transverse slot 114.

In light of the above discussion of the structure of the valve assembly 100, the method of using the spring clip 128 as a quick-connect assembly to join fluid line 116 and valve housing 102 will now be described. First, the second spacing element 124 is placed on the fluid line 116 during manufacturing of the fluid line assembly 116. The first spacing element 120 is placed around the fluid line assembly 116 such that it is fitted adjacent to the raised or beaded portion 118. Next, the fluid line assembly is inserted into the valve inlet port 104 of the valve housing 102 until the spacing element 120 comes into pressurized contact with the valve stop 122. The second spacing element 124 is inserted into the inlet passage 106 adjacent to the step 126. In such position, the transverse slot 114 will be clear of the second spacing element 124.

Next, the spring clip 128 is inserted into either open end of the transverse slot 114 until the spring clip wings 130 and 132 contact the surface of the valve housing 102 and the retaining tabs 134 and 136 expand beyond the outer wall 138 of the valve housing 102. In this configuration, the retaining tabs 134 and 136 may or may not engage the outer wall 138, thereby preventing the spring clip 128 from being removed out of the transverse slot 114. When the spring clip 128 is fully inserted into transverse slot 114, the spring clip 128 is compressed, whereby the spring force of the spring clip 128 is exerted on the second spacing element 124 and, by effect, on the raised or beaded portion 118 to retain the fluid line assembly 116 in sealing contact with the valve housing 102.

In further embodiments (not pictured), the valve assembly 100 and valve assembly 10 may include both retaining tangs 40 and 42 and retaining tabs 134 and 136.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions between various examples is expressly contemplated herein, even if not specifically shown or described, so that one of ordinary skill in the art would appreciate from disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for securing a fluid supply line to an inlet port formed in a face of a valve housing, the method comprising:
    inserting a fluid supply line with a raised portion near an end portion of said fluid supply line and a spacing element around said fluid supply line between said raised portion and said end portion into said inlet port, wherein said valve housing has a transverse slot, said transverse slot having a first opening and a second opening on opposing sides of said valve housing on a same end of the said valve housing as said inlet port;
    inserting a spring clip into at least one of said first opening and said second opening of said transverse slot, wherein said spring clip has a folded plate-like structure that includes a first U-shaped leg and a second U-shaped leg, said first and second U-shaped legs being spaced apart and connected to one another by a bridging portion that is disposed at an insertion end of said spring clip; whereby
    said spring clip securely holds said fluid supply line in sealing engagement with said inlet port.

2. The method according to claim 1, wherein said transverse slot includes a tang retainer.

3. The method according to claim 2, wherein said spring clip includes at least one retaining tang.

4. The method according to claim 3, further comprising inserting said spring clip until said retaining tang engages said tang retainer.

5. The method according to claim 1, wherein said spring clip includes at least one retaining tab and wherein said at least one retaining tab must be independently compressed from said spring clip to remove said spring clip from said transverse slot.

6. The method according to claim 5, further comprising inserting said spring clip until said at least one retaining tab passes through said transverse slot and expands beyond an outer wall of said valve housing.

7. The method according to claim 1, further comprising inserting a washer into said inlet port, wherein said spring clip exerts pressure on said washer and said raised portion to securely hold the fluid supply line in sealing engagement with said inlet port.

8. A gas valve assembly, comprising:
    a valve housing having an inlet port on one face of said valve housing and having at least one transverse slot, said transverse slot having a first opening and a second opening on opposing sides of said valve housing;
    a fluid supply line having a valve insertion end inserted into said inlet port, wherein said fluid supply line has a raised portion near said valve insertion end and has a spacing element between said raised portion and said valve insertion end; and
    a spring clip inserted into said transverse slot to sealingly retain said fluid supply line into said inlet port, wherein said spring clip is a universal spring clip that is configured to be inserted in either said first opening or said second opening, and wherein said spring clip has a folded plate-like structure that includes a first U-shaped leg and a second U-shaped leg, said first and second U-shaped legs being spaced apart and connected to one another by a bridging portion that is disposed at an insertion end of said spring clip.

9. The gas valve assembly according to claim 8, wherein said spacing element is an O-ring.

10. The gas valve assembly according to claim 9, wherein said spring clip is comprised of at least one of a plurality of tabs and a plurality of tangs.

11. The gas valve assembly according to claim 8, wherein said transverse slot has a tang retainer and said spring clip has at least one retaining tang capable of engaging said tang retainer to retain said spring clip in said transverse slot.

12. The gas valve assembly according to claim 11, wherein said at least one retaining tang of said spring clip engages said tang retainer when said spring clip applies pressure to said raised portion to maintain said fluid supply line in sealing engagement with said inlet port and secured in said valve housing.

13. The gas valve assembly according to claim 12, wherein when pressure is applied to said raised portion, said spacing element is sealingly compressed between said raised portion and said inlet port.

14. A gas valve assembly, comprising:
   a valve housing having an inlet port on one face of said valve housing and having at least one transverse slot extending from a first opening on a first side of said valve housing to a second opening on an opposing second side of said valve housing;
   a fluid supply line having a valve insertion end inserted into said inlet port, wherein said fluid supply line has a raised portion near said valve insertion end, has a first spacing element between said raised portion and said valve insertion end, and has a second spacing element between said raised portion and said transverse slot; and
   a spring clip inserted into said transverse slot to sealingly retain said fluid supply line into said inlet port, wherein said spring clip has a folded plate-like structure that includes a first U-shaped leg and a second U-shaped leg, said first and second U-shaped legs being spaced apart and connected to one another by a bridging portion that is disposed at an insertion end of said spring clip.

15. The gas valve assembly according to claim 14, wherein said first spacing element is an O-ring.

16. The gas valve assembly according to claim 14, wherein said second spacing element is a washer.

17. The gas valve assembly according to claim 14, wherein said spring clip has at least one retaining tab capable of retaining said spring clip in said transverse slot.

18. The gas valve assembly according to claim 14, wherein said spring clip applies pressure to said raised portion to maintain said fluid supply line in sealing engagement with said inlet port and secured in said valve housing.

19. The gas valve assembly according to claim 18, wherein when pressure is applied to said raised portion, said spacing element is sealingly compressed between said raised portion and said inlet port.

20. The gas valve assembly according to claim 14, wherein said spring clip is comprised of a plurality of tabs.

21. The gas valve assembly according to claim 14, further comprising a plurality of retaining tabs on said spring clip, wherein said retaining tabs engage an outer wall of said valve housing when said spring clip is fully inserted in said transverse slot and wherein the retaining tabs prevent tampering of said gas valve assembly without damaging said fluid supply line.

* * * * *